United States Patent
Bianchi et al.

(10) Patent No.: US 11,521,142 B2
(45) Date of Patent: Dec. 6, 2022

(54) PREDICTIVE ASSET MAINTENANCE

(71) Applicant: International Business Machines Corporation, Armonk, NY (US)

(72) Inventors: Thiago Bianchi, São Carlos (BR); Tiago Bertoni Scarton, São Paulo (BR); Thiago Roberto Fontes Iunes, Santos (BR); Marlon Nascimento Vicente, Campinas (BR); Tarcisio Pereira, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/130,892

(22) Filed: Sep. 13, 2018

(65) Prior Publication Data

US 2020/0090093 A1    Mar. 19, 2020

(51) Int. Cl.
*G06Q 10/06* (2012.01)
*G06N 3/04* (2006.01)
(Continued)

(52) U.S. Cl.
CPC ........ *G06Q 10/06315* (2013.01); *G01W 1/10* (2013.01); *G06N 3/0454* (2013.01);
(Continued)

(58) Field of Classification Search
CPC ............. G06Q 10/20; G06Q 10/06315; G06Q 10/06311; G06Q 10/0635; G01W 1/10; G06F 17/18; G06N 3/0454
(Continued)

(56) References Cited

U.S. PATENT DOCUMENTS

| 7,356,393 B1 * | 4/2008 | Schlatre ................ G06Q 10/06 701/29.3 |
| 9,262,255 B2 | 2/2016 | Hampapur et al. |

(Continued)

FOREIGN PATENT DOCUMENTS

| WO | 2008133922 A1 | 11/2008 |
| WO | 2016073725 A1 | 5/2016 |

OTHER PUBLICATIONS

Newnham, "Correlation Coefficients in Meteorology," Nature, Mar. 17, 1928 (Year: 1928).*
(Continued)

*Primary Examiner* — Richard W. Crandall
(74) *Attorney, Agent, or Firm* — Kunzler Bean & Adamson

(57) ABSTRACT

A method for asset maintenance includes determining a location of an asset, receiving meteorological data corresponding to the location, determining forecasted meteorological conditions for the asset from the meteorological data, determining a forecasted probability of degradation or failure of the asset based, at least in part, on the forecasted meteorological conditions, and dispatching asset maintenance services for the asset responsive to determining that the forecasted probability of degradation or failure of the asset is above a selected threshold. The method may also include collecting sensor data corresponding to the asset, and determining the forecasted probability of degradation or failure of the asset based, at least in part, on the forecasted meteorological conditions and the sensor data. A corresponding apparatus, computer program product, and computer system are also disclosed herein.

20 Claims, 5 Drawing Sheets

(51) Int. Cl.
*G01W 1/10* (2006.01)
*G06Q 10/00* (2012.01)

(52) U.S. Cl.
CPC ... *G06Q 10/0635* (2013.01); *G06Q 10/06311* (2013.01); *G06Q 10/20* (2013.01)

(58) Field of Classification Search
USPC .......................................................... 705/305
See application file for complete search history.

(56) References Cited

U.S. PATENT DOCUMENTS

| | | | |
|---|---|---|---|
| 9,299,046 B2 | 3/2016 | Davenport et al. | |
| 9,424,736 B2 | 8/2016 | Boss et al. | |
| 10,613,252 B1* | 4/2020 | Mecikalski | G01W 1/10 |
| 11,113,603 B1* | 9/2021 | Teig | G06F 17/18 |
| 2009/0006169 A1* | 1/2009 | Wetzer | G06Q 10/063112 705/7.14 |
| 2009/0113049 A1 | 4/2009 | Nasle et al. | |
| 2011/0071963 A1* | 3/2011 | Piovesan | G06Q 10/00 706/11 |
| 2012/0130759 A1 | 5/2012 | Davenport et al. | |
| 2014/0244188 A1* | 8/2014 | Bai | F03D 17/00 702/60 |
| 2014/0324495 A1* | 10/2014 | Zhou | G06Q 10/06311 705/7.13 |
| 2014/0365422 A1 | 12/2014 | Hampapur et al. | |
| 2016/0275777 A1* | 9/2016 | Boss | G06Q 30/0252 |
| 2017/0364795 A1* | 12/2017 | Anderson | G06N 20/10 |
| 2019/0012598 A1* | 1/2019 | Chang | G06Q 50/06 |

OTHER PUBLICATIONS

Qian, Cheng and Wen Zhou, "Two Approaches for Statistical Prediction of Non-Gaussian Climate Extremes: A Case Study of Macao Hot Extremes during 1912-2012" Journal of Climate vol. 28 p. 623-636 published Jan. 15, 2015 (Year: 2015).*
"Choosing a Personal Weather Stations," [online], last archived Jul. 10, 2017, available at: < https://web.archive.org/web/20170710182559/ https://www.weather.gov/media/epz/mesonet/CWOP-PWSintro. pdf > (Year: 2017).*
Hardesty, Larry, "Explained: Neural Networks," MIT News [online], published Apr. 14, 2017, available at: < https://news.mit.edu/2017/ explained-neural-networks-deep-learning-0414 > (Year: 2017).*
Uptake, "How AI is Making Predictive Maintenance a Reality for the Industrial IOT," published on Jun. 11, 2018, available at: <https://www.uptake.com/blog/how-ai-is-making-predictive-maintenance-a-reality-for-the-industrial-iot >. (Year: 2018).*
McCaffrey, James, "Deep Neural Networks: A getting Started Tutorial," Neural Network Lab [online], published on Jun. 13, 2014, available at: < https://visualstudiomagazine.com/Articles/2014/06/ 01/Deep-Neural-Networks.aspx?p=1 > (Year: 2014).*
H. Zhang et al., "A Hybrid Prognostics and Health Management Approach for Condition-Based Maintenance", Proceedings of the 2009 IEEE IEEM, Dec. 8-11, 2009, pp. 1165-1169.
M. W. Gardner et al., "Artificial Neural Networks (The Multilayer Perceptron)—A Review of Applications in the Atmospheric Sciences", Atmospheric Environment vol. 32, No. 14/15, Jun. 1998, pp. 2627-2636.
Y. Lecun et al. "Convolutional Networks for Images, Speech, and Time-Series", The handbook of brain theory and neural networks 3361.10 (1995): 1995. pages 1-14.
J. Nilsson et al., "Maintenance Management of Wind Power Systems Using Condition Monitoring Systems—Life Cycle Cost Analysis for Two Case Studies", IEEE Transactions on Energy Conversion, vol. 22, No. 1, Mar. 2007, pp. 223-229.
X. Han et al., "Optimization-Based Decision Support Software for a Team-in-the-Loop Experiment: Multilevel Asset Allocation", IEEE Transactions on Systems, Man, and Cybernetics: Systems, vol. 44, No. 8, Aug. 2014, pp. 1098-1112.
"Predictive Asset Maintenance: what are the business benefits—and how do we prove them?", Data Points Discussions from Teradata, http://blogs.teradata.com/data-points/predictive-asset-maintenance-benefits-prove/, known about as early as Mar. 26, 2018, pp. 1-5.
PRNewswire, "Sensors and Embedded Systems in the Internet of Things (IoT) 2016-2021: Market Analysis and Forecasts for the $1.6 Trillion Business—Research and Markets", Research and Markets, Aug. 30, 2016, pp. 1-9.
G. Khan et al., "Spatial Analysis of Weather Crash Patterns", ASCE Library, Journal of Transportation Engineering vol. 134 Issue 5—May 2008, pp. 191-202.
T. Koskela et al., "Time Series Prediction with Multilayer Perceptron, FIR and Elman Neural Networks", Proceedings of the World Congress on Neural Networks. INNS Press San Diego, USA, 1996, pp. 1-5.
J. Kobietus, "Weather analytics help forecast, prevent and mitigate outages", IBM Big Data & Analytics Hub, Blogs, Oct. 9, 2015, pp. 1-3.
"Weather API", Weather API—OpenWeatherMap, https:// openweathermap.org/api, know about as early as Mar. 26, 2018, pp. 1-5.
"Weather Company Data for IBM Bluemix APIs", Wether Company Data API, https://twcservice.mybluemix.net/rest-api/, known about as early as Mar. 26, 2018, pp. 1-100.

* cited by examiner

PREDICTIVE ASSET MAINTENANCE

BACKGROUND

The subject matter disclosed herein relates generally to asset maintenance and specifically to predictive asset maintenance.

Asset degradation and failure can result in costly events such as blockage of traffic, manufacturing stoppages, and invalid financial transactions. Recovering from such events can be costly, time consuming, and result in unwanted legal liabilities.

SUMMARY OF THE INVENTION

A method for asset maintenance includes determining a location of an asset, receiving meteorological data corresponding to the location, determining forecasted meteorological conditions for the asset from the meteorological data, determining a forecasted probability of degradation or failure of the asset based, at least in part, on the forecasted meteorological conditions, and dispatching asset maintenance services for the asset responsive to determining that the forecasted probability of degradation or failure of the asset is above a selected threshold. The method may also include collecting sensor data corresponding to the asset, and determining the forecasted probability of degradation or failure of the asset based, at least in part, on the forecasted meteorological conditions and the sensor data. A corresponding apparatus, computer-program product, and computer system are also disclosed herein.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

One of skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The embodiments disclosed herein recognize that meteorological data and asset-related sensor data (e.g., IOT data) can be leveraged to improve asset maintenance. Consequently, maintenance services can be more effectively and efficiently deployed.

Figure 1:
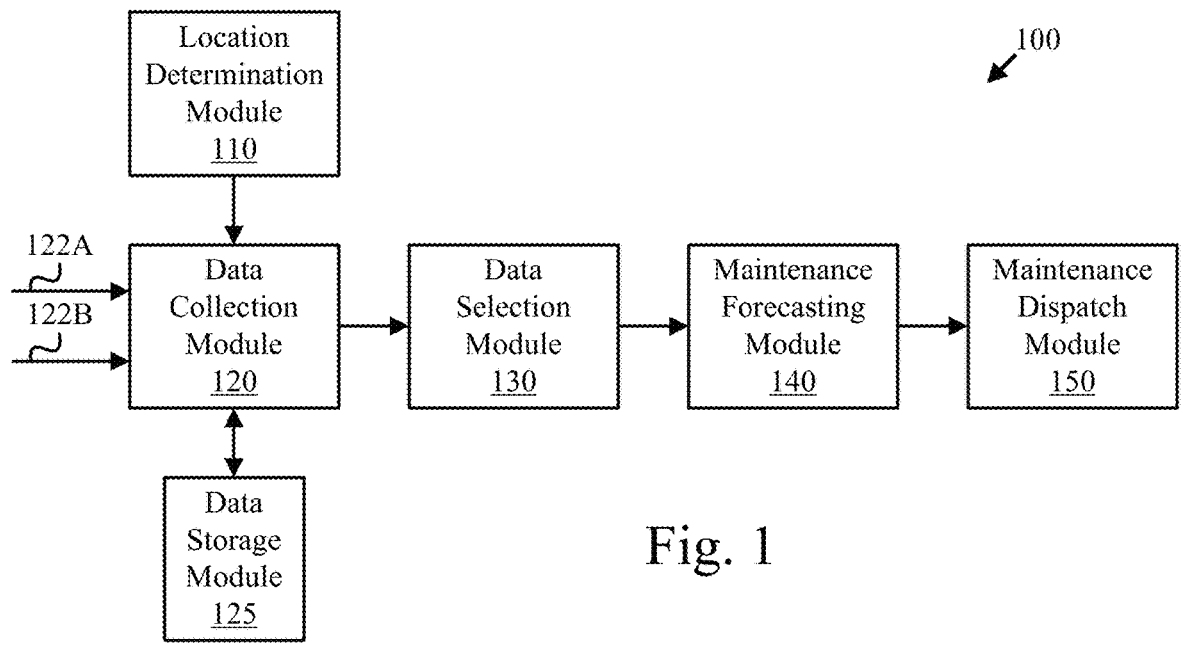
FIG. 1 is a block diagram of one example of an asset maintenance apparatus in accordance with at least one embodiment of the present invention.

FIG. 1 is a block diagram of one example of an asset maintenance apparatus 100. As depicted, the asset maintenance apparatus 100 includes a location determination module 110, a data collection module 120, a data storage module 125, a data selection module 130, a maintenance forecasting module 140, and a maintenance dispatch module 150. The asset maintenance apparatus 100 forecasts when an asset is likely to degrade or fail, and dispatches maintenance services for the asset to address the likely degradation or failure.

The location determination module 110 may determine the location of an asset through a variety of methods. Examples include: user specification of the location of the asset, receiving GPS data corresponding to the asset, and signal triangulation. The location of the asset may comprise a location name and/or geographic coordinates.

The data collection module 120 may collect sensor data 122A and meteorological data 122B corresponding to the asset. In some embodiments, the meteorological data 122B is retrieved from a weather server or the like. The collected data 122 may be stored and archived by the data storage module 125 and retrieved as needed. Examples of sensor data include voltage, impedance, motor speed, asset temperature, asset altitude, and the like. Examples of meteorological data include precipitation levels, ambient temperature, ambient pressure, humidity, and wind direction and speed.

The data selection module 130 may use historical data, including historical data that corresponds to asset degradation and failure events, to select which sensor data and meteorological data elements are predictive of (relevant to) such events. Data elements that are not predictive of such events may be discarded and/or not collected in the future.

In some embodiments, selection of the predictive sensor data and meteorological data elements includes determining correlation coefficients between degradation and failure data, and the sensor and meteorological data elements. In one embodiment, the correlation coefficients are Spearman's rank correlation coefficients.

The maintenance forecasting module 140 may use additional (i.e., currently) collected data (that was selected as predictive) to forecast asset degradation or failure. The maintenance dispatch module 150 may dispatch maintenance services when the forecasted asset degradation or failure is imminent.

Figure 2:
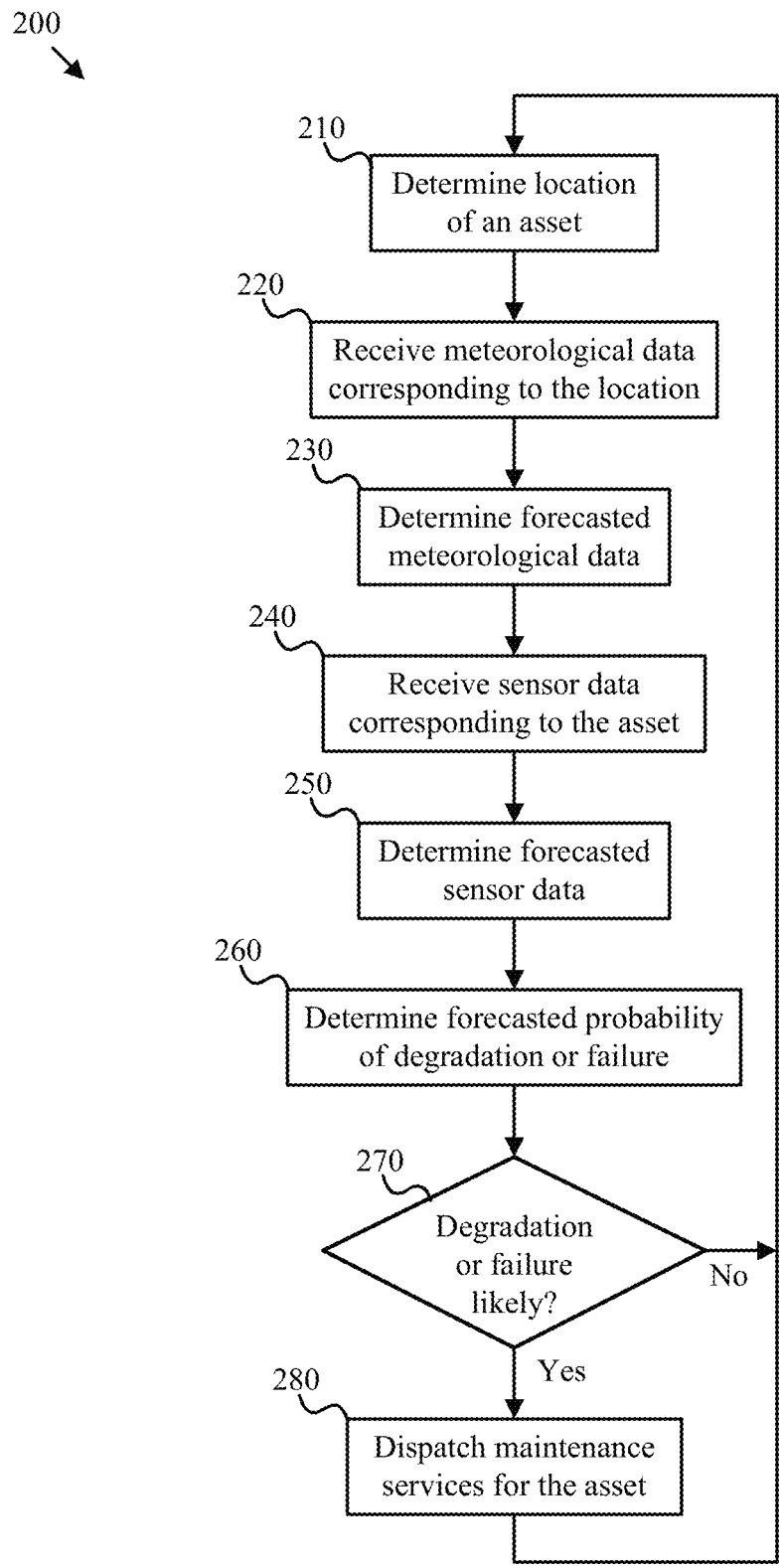
FIG. 2 is a flowchart of one example of an asset maintenance method in accordance with at least one embodiment of the present invention.

FIG. 2 is a flowchart of one example of an asset maintenance method 200. The depicted example of the asset maintenance method 200 includes determining (210) the location of an asset, receiving (220) meteorological data corresponding to the location, determining (230) forecasted meteorological data, receiving (240) sensor data corresponding to the asset, determining (250) forecasted sensor data, determining (260) a forecasted probability of degradation or failure, determining (270) whether degradation or failure is likely, and dispatching (280) maintenance services for the asset. The asset maintenance method 200 may be conducted by the asset maintenance apparatus 100 or the like.

Determining (210) the location of an asset may include user specification of the location of the asset, receiving location data corresponding to the asset, and calculating the position of the asset via signal processing.

Receiving (220) meteorological data corresponding to the location may include accessing a weather server or the like that provides current meteorological conditions data at a requested location. Determining (230) forecasted meteorological data may include executing weather forecasting algorithms and/or executing aneural network (i.e., an artificial neural network) that forecasts future meteorological conditions from the received meteorological data.

Receiving (240) sensor data corresponding to the asset may include retrieving data from one or more sensors associated with the asset. Determining (250) forecasted sensor data may include using a neural network (e.g., the same neural network used in step 230) to forecast future sensor data from the current sensor data and the meteorological data. Determining (260) a forecasted probability of degradation or failure may include using another neural network that determines the forecasted probability of degradation or failure from the current sensor and meteorological data and/or the forecasted sensor and meteorological data.

Determining (270) whether degradation or failure is likely may include comparing the forecasted probability of degradation or failure with a selected threshold value. If degradation or failure is likely, the method proceeds by dispatching (280) maintenance services for the asset. Dispatching of the maintenance services may be substantially immediate or deferred to align more closely with the expected degradation or failure. If degradation or failure is not likely, the method loops to the determining step 210.

Figure 3:
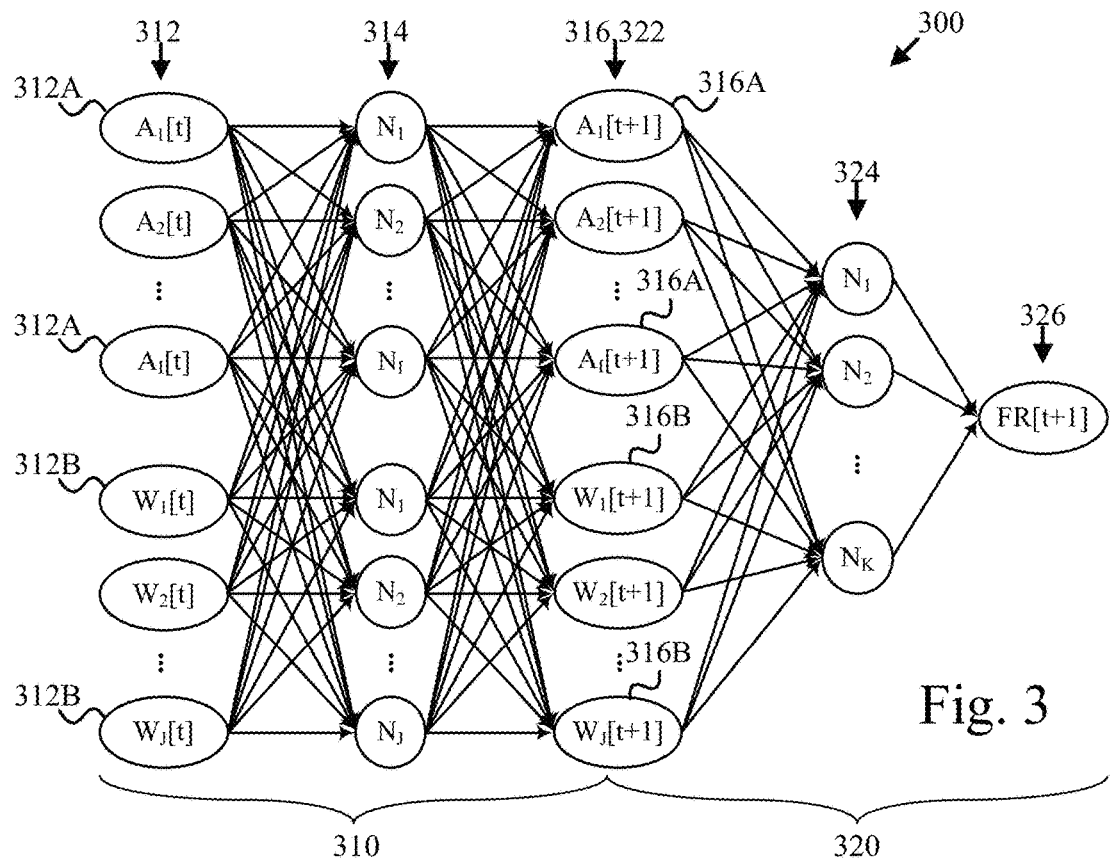
FIG. 3 is a block diagram of maintenance forecasting module in accordance with at least one embodiment of the present invention.

FIG. 3 is a block diagram of maintenance forecasting module 300. As depicted, the maintenance forecasting module 300 is essentially a neural network that includes an input stage 310 and an output stage 320. The maintenance forecasting module 300 is one example of the maintenance forecasting module 140 depicted in FIG. 1.

The depicted input stage 310 includes input nodes 312, hidden nodes 314, and output nodes 316. The depicted output stage 320 includes input nodes 322, hidden nodes 324, and output nodes 326.

The input nodes 312 include sensor data nodes 312A and weather data nodes 312B that respectively correspond to sensor data and meteorological data corresponding to an asset. The depicted hidden nodes 314 comprise a single layer of nodes that each correspond to a particular input node 312. However, the invention is not limited to the depicted configuration.

In the depicted example, the input stage 310 receives sensor data and meteorological data and provides forecasted sensor data and forecasted meteorological data at the output nodes 316A and 316B, respectively. In the depicted configuration, the output nodes 316 of the input stage also function as the input nodes 322 of the output stage 320. The depicted hidden nodes 324 process the forecasted sensor data and meteorological data and provide data to the output node 326. In the depicted configuration, the hidden nodes 324 comprise a single layer of nodes that each connect to a single output node 326 that provides a likelihood or probability of a failure or degradation event for the asset. However, the invention is not limited to the depicted configuration.

The input stage 310 may be viewed as a first neural network and the output stage 320 may be viewed as a second neural network. In some embodiments, the maintenance forecasting module 300 is implemented as software executing on a processor. In such embodiments, the input stage 310 (first neural network) may be executed previous to execution of the output stage 320 (the second neural network).

Figure 4:
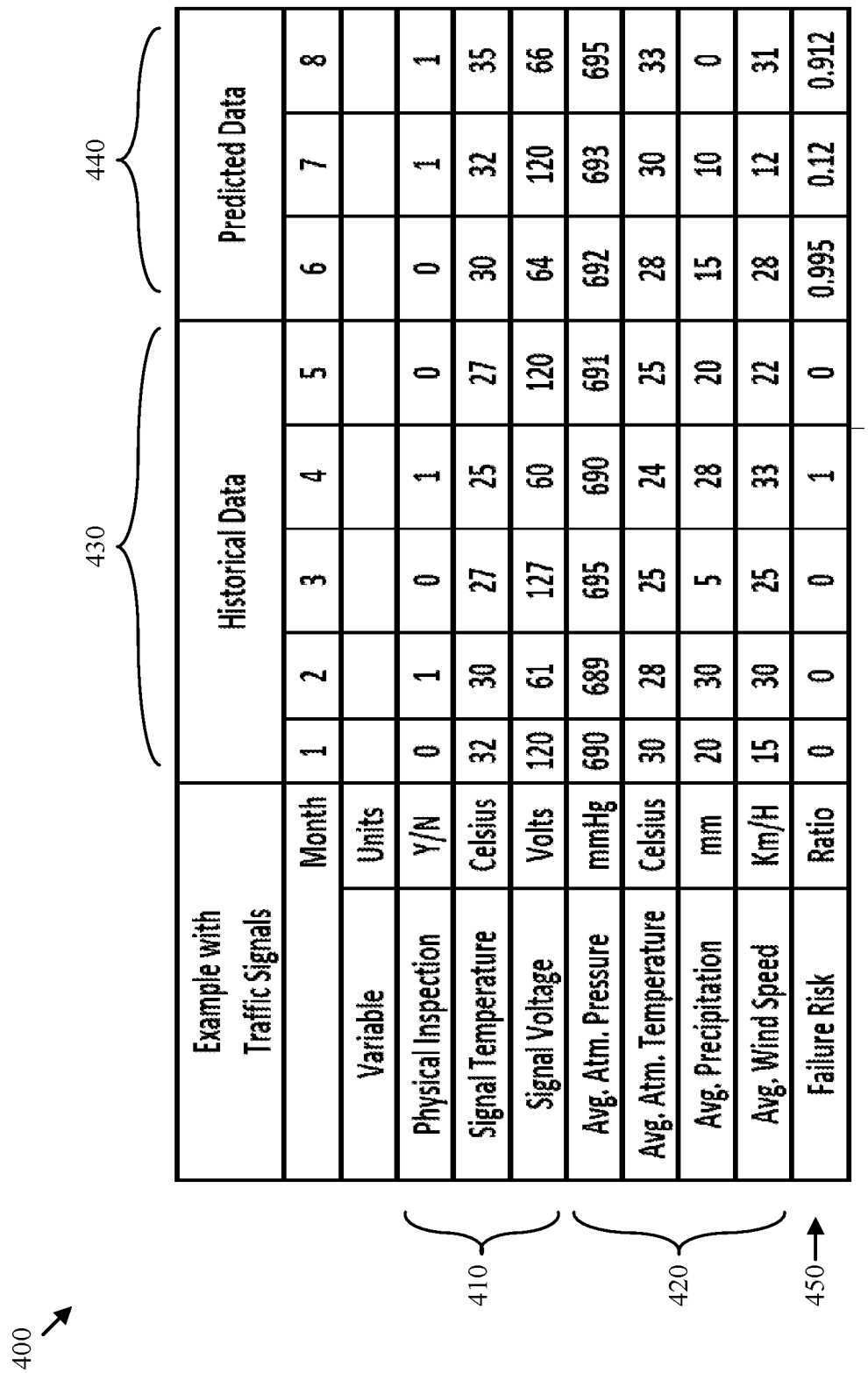
FIG. 4 is a text diagram of one example of maintenance forecasting data in accordance with at least one embodiment of the present invention.

FIG. 4 is a text diagram of one example of maintenance forecasting data 400. As depicted, the maintenance forecasting data 400 includes sensor data 410 and meteorological data 420 which both include historical data 430 and forecasted data 440. Both the historical data 430 and forecasted data 440 are leveraged to determine a failure risk metric 450. One of skill in the art will appreciate that the historical data 430 including historical failure events 450 may be used to train the neural networks of the maintenance forecasting module 300 or the like.

One of skill in the art will also appreciate that the various embodiments disclosed herein provide improved predictive asset maintenance. When dealing with specific types of assets, failure prevention through preventive maintenance may lead to certain difficulties such as incorrect maintenance periods and unnecessary maintenance. Considering that, for some types of assets, these faults can be influenced by climatic factors such as atmospheric pressure, temperature, storms, snow, wind, altitude, and others. Consequently, combining meteorological factors with the asset readings improves forecasting of asset degradation and/or failure.

With this predictive method, companies can avoid or reduce customer's issues when meteorological disruption is coming without waiting for a customer's call. Prediction of potential problems in advance enables companies to prepare assets for extreme conditions. For example, if blizzards increase the failure rate of traffic lights and result in an increased likelihood of traffic jams, preventative maintenance services can be dispatched to those traffic lights that are likely to fail under blizzard conditions when a blizzard is forecast. Consequently, the probability of asset failure and the likelihood of a traffic jam can be substantially reduced.

Figure 5A:
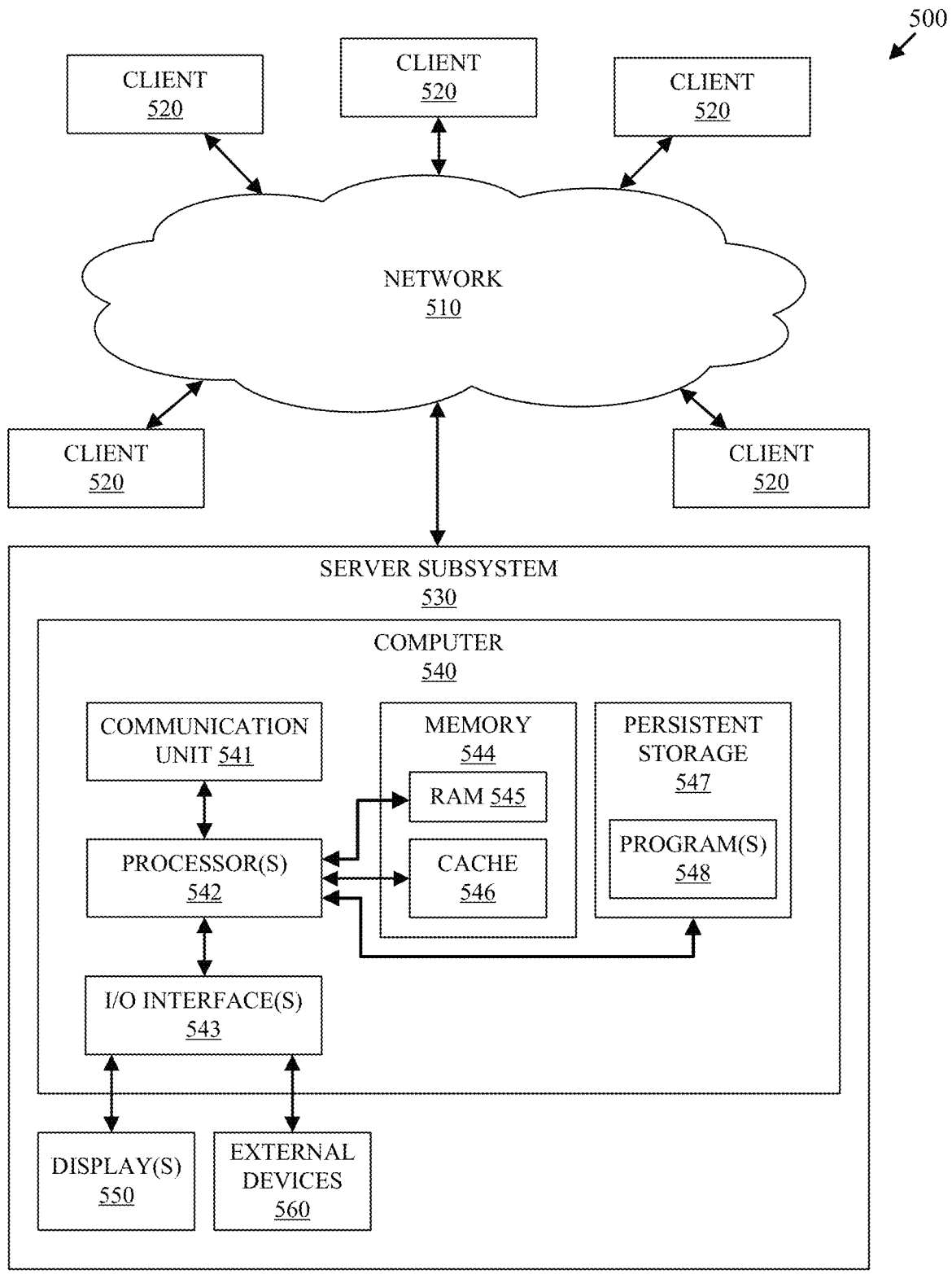
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 560. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
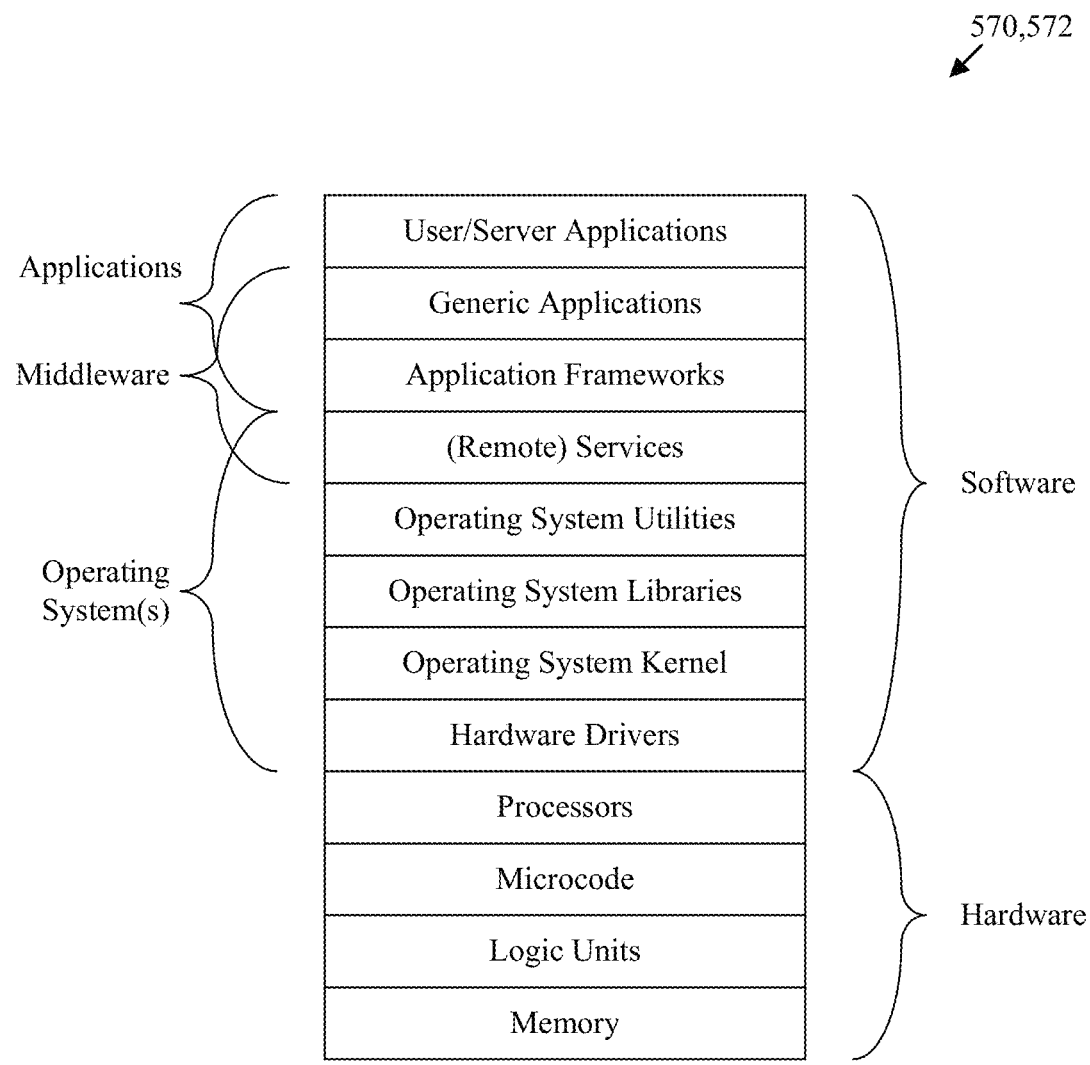
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given by way of example and are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves; electromagnetic waves propagating through a waveguide or other transmission media (e.g., light pulses passing through a fiber-optic cable); or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for asset maintenance, the method comprising: collecting, via one or more processors, historical sensor data corresponding to an asset to produce collected historical sensor data; collecting, via the one or more processors, historical meteorological data corresponding to a location of the asset to produce collected historical meteorological data; selecting, via the one or more processors, at least a portion of the collected historical sensor data that corresponds to historical degradation or historical failure of the asset to produce sensor input data; selecting, via the one or more processors, at least a portion of the collected historical meteorological data that corresponds to historical degradation or historical failure of the asset to produce meteorological input data; utilizing the sensor input data and the meteorological input data to train a neural network executed by the one or more processors; forecasting, via an input stage of the neural network, sensor data for the asset based, at least in part, on the sensor input data; forecasting, via the input stage of the neural network, meteorological data for the asset based, at least in part, on the meteorological input data; outputting, via the input stage of the neural network executed by the one or more processors, the forecasted sensor data and the forecasted meteorological data to an output stage of the neural network; determining, via the output stage of the neural network executed by the one or more processors, a forecasted probability of degradation or failure of the asset based on a correlation of the forecasted sensor data and the forecasted meteorological data; and automatedly dispatching, via the one or more processors, asset maintenance services for the asset responsive to determining that the forecasted probability of degradation or failure of the asset is greater than a selected threshold, wherein: the input stage of the neural network includes a first plurality of first input nodes and a second plurality of first input nodes configured to receive a plurality of different data inputs in which the first plurality of first input nodes are configured to receive the sensor input data and the second plurality of input nodes are configured to receive the meteorological input data, a first plurality of first output nodes and a second plurality of first output nodes configured to provide a plurality of different types of data outputs comprising at least the forecasted sensor data and the forecasted meteorological data, and a plurality of first hidden nodes, wherein each first output node of the input stage is coupled to each first hidden node of the plurality of first hidden nodes, the output stage of the neural network includes a first plurality of second input nodes, a second plurality of second input nodes, and a plurality of second hidden nodes configured to process the forecasted sensor data and the forecasted meteorological data and provide data to a single second output node, wherein each second input node of the output stage is coupled to each second hidden node of the plurality of second hidden nodes, the first plurality of first output nodes for the input stage of the neural network further function as the first plurality of second input nodes for the output stage of the neural network and the second plurality of first output nodes for the input stage of the neural network further function as the second plurality of second input nodes for the output stage of the neural network such that each input/output node is coupled to each of the first hidden nodes and each of the second hidden nodes, the first plurality of first input nodes and the first plurality of second input nodes include a same quantity of input nodes, the second plurality of first input nodes and the second plurality of second input nodes include a same quantity of input nodes, and the input stage of the neural network includes a greater quantity of output nodes than the output stage of the neural network.

2. The method of claim 1, further comprising determining the location of the asset, wherein the location of the asset comprises geographic coordinates.

3. The method of claim 1, further comprising: determining which first data elements of the portion of the collected historical sensor data are relevant to the degradation or failure of the asset; and determining which second data elements of the portion of the collected historical meteorological data are relevant to the degradation or failure of the asset, wherein: selecting the at least the portion of the collected historical sensor data that corresponds to historical degradation or historical failure of the asset to produce the sensor input data comprises selecting the first data elements, and selecting the at least the portion of the collected historical meteorological data that corresponds to historical degradation or historical failure of the asset to produce the meteorological input data comprises selecting the second data elements.

4. The method of claim 3, further comprising: pruning the first data elements of the portion of the collected historical sensor data to eliminate non-relevant first data elements; and pruning the second data elements of the portion of the collected historical meteorological data to eliminate non-relevant second data elements.

5. The method of claim 3, wherein: determining which first data elements are relevant comprises determining a first set of correlation coefficients for the first data elements; and determining which second data elements are relevant comprises determining a second set of correlation coefficients for the second data elements.

6. The method of claim 5, wherein the first set of correlation coefficients and the second set of correlation coefficients are Spearman's rank correlation coefficients.

7. The method of claim 2, further comprising receiving additional data elements that are predictive of degradation or failure of the asset.

8. The method of claim 7, wherein the forecasted probability of degradation or failure of the asset is further based on the additional data elements.

9. An apparatus, comprising: a data collection module that: collects historical sensor data corresponding to an asset to produce collected historical sensor data, collects historical meteorological data corresponding to a location of the asset to produce collected historical meteorological data;
a data selection module that: selects at least a portion of the collected historical sensor data that corresponds to historical degradation or historical failure of the asset to produce sensor input data, and selects at least a portion of the collected historical meteorological data that corresponds to historical degradation or historical failure of the asset to produce meteorological input data;
a maintenance forecasting module that comprises a neural network including an input stage and an output stage, wherein: the maintenance forecasting module is configured to utilize the sensor input data and the meteorological input data to train the neural network, the input stage of the neural network is configured to:
forecast sensor data for the asset based, at least in part, on the sensor input data, forecast meteorological data for the asset based, at least in part, on the meteorological input data, and output the forecasted sensor data and the forecasted meteorological data to the output stage of the neural network, and the output stage of the neural network is configured to:
determine a forecasted probability of degradation or failure of the asset based on a correlation of the forecasted sensor data and the forecasted meteorological data; and
a maintenance dispatch module that dispatches maintenance services for the asset responsive to determining that the forecasted probability of degradation or failure of the asset is greater than a selected threshold;
and wherein: the input stage of the neural network includes a first plurality of first input nodes and a second plurality of first input nodes configured to receive a plurality of different data inputs in which the first plurality of first input nodes are configured to receive the sensor input data and the second plurality of first input nodes are configured to receive the meteorological input data, a first plurality of first output nodes and a second plurality of first output nodes configured to provide a plurality of different types of data outputs comprising at least the forecasted sensor data and the forecasted meteorological data, and a plurality of first hidden nodes, wherein each first output node of the input stage is coupled to each first hidden node of the plurality of first hidden nodes, the output stage of the neural network includes a first plurality of second input nodes, a second plurality of second input nodes, and a plurality of second hidden nodes configured to process the forecasted sensor data and the forecasted meteorological data and provide data to a single second output node, wherein each second input node of the output stage is coupled to each second hidden node of the plurality of second hidden nodes, the first plurality of first output nodes for the input stage of the neural network further function as the first plurality of second input nodes for the output stage of the neural network and the second plurality of first output nodes for the input stage of the neural network further function as the second plurality of second input nodes for the output stage of the neural network such that each input/output node is coupled to each of the first hidden nodes and each of the second hidden nodes, the first plurality of first input nodes and the first plurality of second input nodes include a same quantity of input nodes, the second plurality of first input nodes and the second plurality of second input nodes include a same quantity of input nodes, the input stage of the neural network includes a greater quantity of output nodes than the output stage of the neural network, and at least a portion of each of the data collection module, the maintenance forecasting module, and the maintenance dispatch module comprise one or more of hardware and one or more non-transitory computer-readable storage media storing executable code.

10. A computer program product comprising a computer-readable storage medium having program instructions embodied therewith, wherein the computer-readable storage medium is not a transitory signal per se, the program instructions executable by one or more processors to cause the one or more processors to perform a method comprising:
collecting, via the one or more processors, historical sensor data corresponding to an asset to produce collected historical sensor data;
collecting, via the one or more processors, historical meteorological data corresponding to a location of the asset to produce collected historical meteorological data;
selecting, via the one or more processors, at least a portion of the collected historical sensor data that corresponds to historical degradation or historical failure of the asset to produce sensor input data;
selecting, via the one or more processors, at least a portion of the collected historical meteorological data that corresponds to historical degradation or historical failure of the asset to produce meteorological input data;
utilizing the sensor input data and the meteorological input data to train a neural network executed by the one or more processors;
forecasting, via an input stage of a neural network executed by the one or more processors, sensor data for the asset based, at least in part, on the sensor input data;
forecasting, via the input stage of the neural network executed by the one or more processors, meteorological data for the asset based, at least in part, on the meteorological input data;
outputting, via the input stage of the neural network executed by the one or more processors, the forecasted sensor data and the forecasted meteorological data to an output stage of the neural network;
determining, via the output stage of the neural network executed by the one or more processors, a forecasted probability of degradation or failure of the asset based on a correlation of the forecasted sensor data and the forecasted meteorological data;
and dispatching, via the one or more processors, asset maintenance services for the asset responsive to determining that the forecasted probability of degradation or failure of the asset is greater than a selected threshold, wherein:
the input stage of the neural network includes a first plurality of first input nodes and a second plurality of first input nodes configured to receive a plurality of different data inputs in which the first plurality of first input nodes are configured to receive the sensor input data and the second plurality of first input nodes are configured to receive the meteorological input data, a first plurality of first output nodes and a second plurality of first output nodes configured to provide a plurality of different types of data outputs comprising at least the forecasted sensor data and the forecasted meteorological data, and a plurality of first hidden nodes, wherein each first output node of the input stage is coupled to each first hidden node of the plurality of first hidden nodes, the output stage of the neural network includes a first plurality of second input nodes, a second plurality of second input nodes, and a plurality of second hidden nodes configured to process the forecasted sensor data and the forecasted meteorological data and provide data to a single second output node, wherein each second input node of the output stage is coupled to each second hidden node of the plurality of second hidden nodes, the first plurality of first output nodes for the input stage of the neural network further function as the first plurality of second input nodes for the output stage of the neural network and the second plurality of first output nodes for the input stage of the neural network further function as the second plurality of second input nodes for the output stage of the neural network such that each input/output node is coupled to each of the first hidden nodes and each of the second hidden nodes, the first plurality of first input nodes and the first plurality of second input nodes include a same quantity of input nodes, the second plurality of first input nodes and the second plurality of second input nodes include a same quantity of input nodes, and the input stage of the neural network includes a greater quantity of output nodes than the output stage of the neural network.

11. The method of claim 1, wherein the input stage is a first neural network.

12. The method of claim 11, wherein the output stage is a second neural network.

13. The method of claim 12, wherein: the first neural network comprises: the plurality of first input nodes, the plurality of first output nodes, and a first single layer of the plurality of first hidden nodes between the plurality of first input nodes and the plurality of first output nodes; the second neural network comprises: the plurality of second input nodes, the single output node, and a second single layer of the plurality of second hidden nodes between the plurality of second input nodes and the single output node; and the plurality of first output nodes and the plurality of second input nodes are the same nodes.

14. The apparatus of claim 9, wherein the input stage is a first neural network.

15. The apparatus of claim 14, wherein the output stage is a second neural network.

16. The apparatus of claim 15, wherein: the first neural network comprises: the plurality of first input nodes, the plurality of first output nodes, and a first single layer of a plurality of first hidden nodes between the plurality of first input nodes and the plurality of first output nodes; the second neural network comprises: the plurality of second input nodes, the single output node, and a second single layer of the plurality of second hidden nodes between the plurality of second input nodes and the single output node; and the plurality of first output nodes and the plurality of second input nodes are the same nodes.

17. The computer program product of claim 10, wherein the input stage is a first neural network.

18. The computer program product of claim 17, wherein the output stage is a second neural network.

19. The computer program product of claim 18, wherein: the first neural network comprises: the plurality of first input nodes, the plurality of first output nodes, and a first single layer of the plurality of first hidden nodes between the plurality of first input nodes and the plurality of first output nodes; the second neural network comprises: the plurality of second input nodes, the single second output node, and a second single layer of the plurality of second hidden nodes between the plurality of second input nodes and the single second output node; and the plurality of first output nodes and the plurality of second input nodes are the same nodes.

20. The computer program product of claim 10, further comprising: receiving additional data elements that are predictive of degradation or failure of the asset; and further basing the forecasted probability of degradation or failure of the asset on the additional data elements.

\* \* \* \* \*